Dec. 31, 1929.                V. A. A. VERNON                 1,742,154
                               TRANSPORT VEHICLE
                         Filed Jan. 12, 1929        2 Sheets-Sheet 1

Dec. 31, 1929.  V. A. A. VERNON  1,742,154
TRANSPORT VEHICLE
Filed Jan. 12, 1929  2 Sheets-Sheet 2

Patented Dec. 31, 1929

1,742,154

UNITED STATES PATENT OFFICE

VERNON ALFRED ALEXANDER VERNON, OF WELLINGTON, NEW ZEALAND

TRANSPORT VEHICLE

Application filed January 12, 1929, Serial No. 332,071, and in New Zealand October 24, 1928.

This invention relates to vehicles used for the transport of passengers or goods, and has for its object the provision of an improved form of vehicle, which is capable of running under its own power, or of being hauled.

The invention consists in providing a vehicle with a set of flanged wheels for running on a rail road, and also with a set of wheels for running on an ordinary road, the latter wheels when the flanged wheels are in use, being raised above the level of the rails, said flanged wheels when the road wheels are being used, being held clear of the ground by the latter.

When the vehicle is provided with its own means of propulsion, the rear wheels of both sets of ordinary road wheels and flanged wheels are power driven, the ordinary road wheels being mounted and geared, so that the action of raising them to their in-operative position, disconnects them from the propelling unit of the vehicle.

The invention is illustrated in the accompanying drawings, and will be more particularly described in conjunction therewith:—

Figure 1:
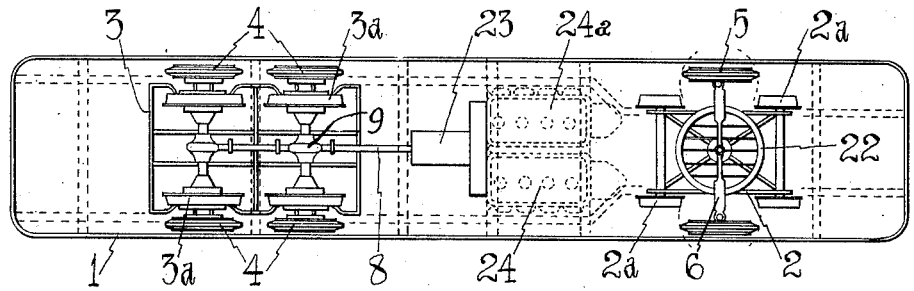
Figure 2:
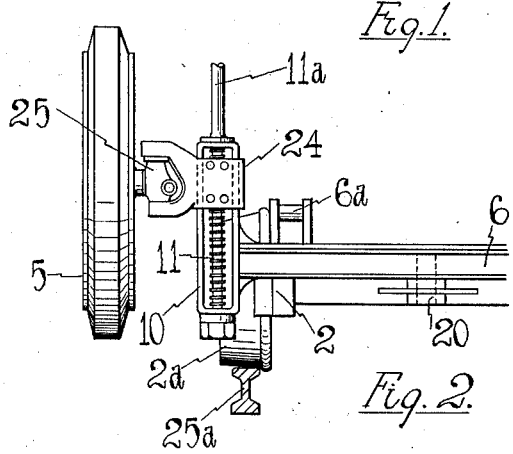
Figure 3:
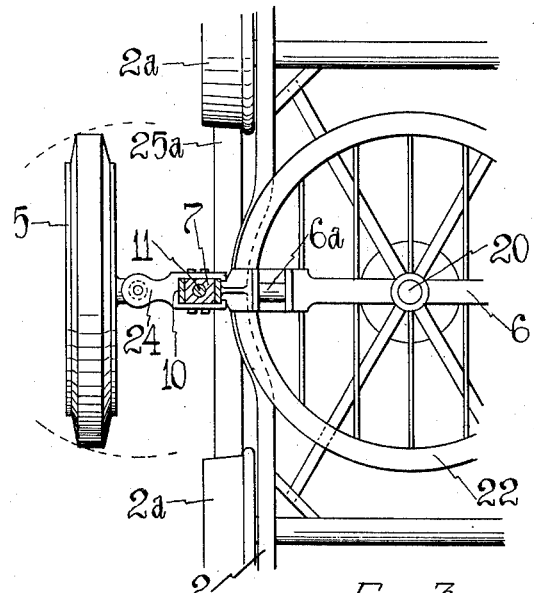
Figure 4:
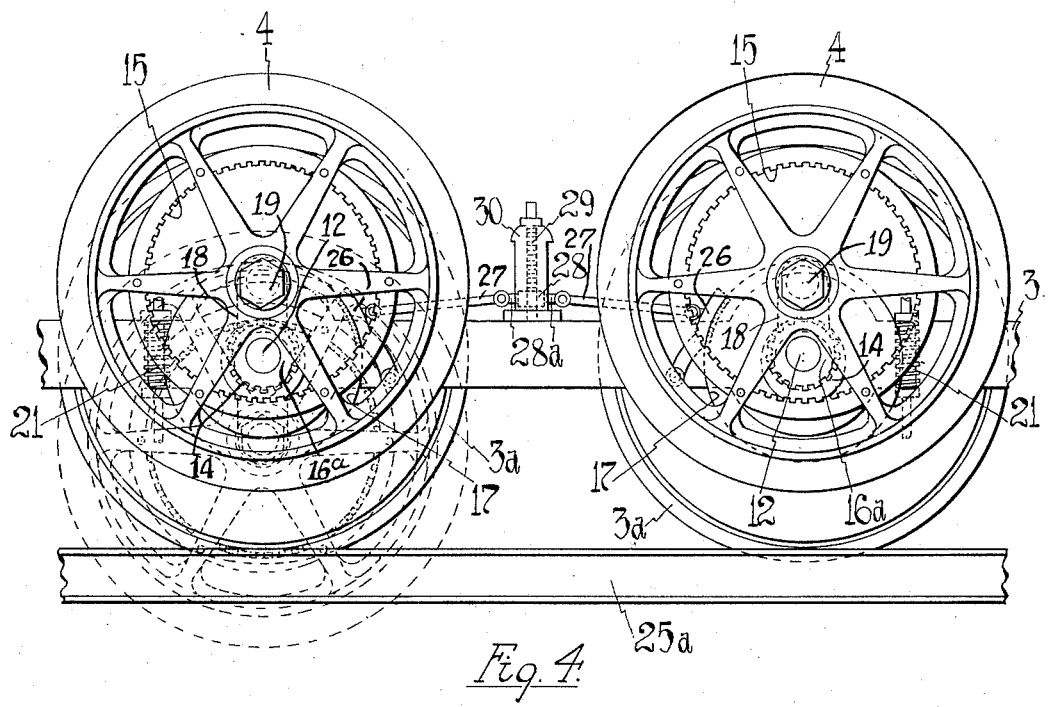
Figure 5:
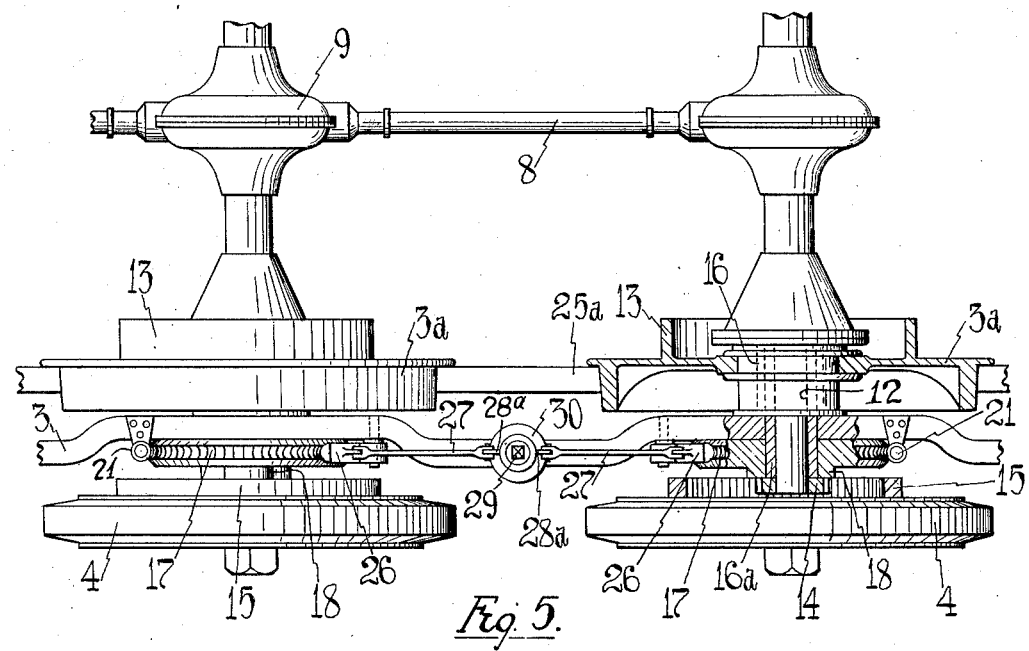

Figure 1 being a plan view of a vehicle fitted according to the invention,

Figure 2 a detail view in elevation illustrating the mounting of the ordinary road wheels and the axle for same at the front of the vehicle, Figure 3 a plan view partly in section of the parts shown in Figure 2, Figure 4 a detail view in part elevation of a rear bogey showing the power driven flanged wheels resting on rails for use, and the power driven ordinary road wheels raised to an inoperative position and, Figure 5 a part plan view and part sectional view of the parts shown in Figure 4, In the drawing 1 represents the under frame of the vehicle, 2 a front four wheel swivelling bogey, 3 a rear-nonswivelling four wheel bogey, 4 two pairs of rear ordinary road wheels, and 5 a pair of front ordinary road wheels, the latter mounted on an axle 6, while 23 represents a gear box and 24$^a$ power units such as internal combustion engines, which can be utilized to drive the ordinary road wheels 4, and the flanged wheels 3$^a$ of the rear bogey 3, through the shafts 8 and intermediate gearing 9.

When it is desired to use the flanged wheels 2$^a$ and 3$^a$ of the bogies 2 and 3 respectively, on rails 25$^a$ the ordinary road wheels 5 and 4 are raised, to clear the latter this being accomplished in the case of the front wheels 5 as follows:—

The front axle 6 is secured to the vehicle underframe and is held against swivelling by the vehicle springing attached at 6$^a$ in the usual automobile manner, each end of said axle 6 being provided with a vertical slotted guide 10, in which is slidable vertically a block 7 having secured thereto a forked fitting 24 carrying the stub axle 25 for a front ordinary road wheel 5. Vertical adjustment of each block 7 in its guide 10 is obtained per medium of a screw 11 anchored in the guide against vertical movement, and threaded through the block 7 the screw 11 being operated through an extension 11$^a$ from any suitable position, either inside or outside the vehicle.

The axle 6 is provided with a fixed centre portion 20 which serves as a king pin about which the front bogey 2 with the front flanged wheels 2$^a$ swivels, said axle 6 being also formed with a rim disc 22 adapted to sit and swivel on the bogey 2, said disc 22 being clipped at its edge to the bogey 2 to prevent any movement thereon other than a rotary movement, about the pin 20.

The screws 11 and sliding blocks 7 enable the front road wheels 5 to be raised above the level of the rails 25$^a$ when the flanged wheels 2$^a$ are required to be run thereon, or to be lowered to project below the level of said rails, (as will be hereinafter described) when the vehicle is to be run on the ordinary road wheels 4 and 5.

If desired the screws 11 can be geared together to operate simultaneously in the same direction and to an equal extent.

The stubb axles 25 can be connected with steering gear such as is used on a motor car, to enable the vehicle to be steered when running on the ordinary road wheels 5 and 4, provision also being made for locking the front bogey 2 against swivelling when using said wheels 5 and 4.

In the case of the rear flanged wheels 3ᵃ the latter are each driven by a live axle 12, and are each provided with a drum 13 to which brake bands can be applied in any known manner, for braking the vehicle.

Each live axle 12 has splined on its outer end a toothed pinion 14 designed to drive a rear ordinary road wheel 4 (when the ordinary road wheels 4 and 5 are being used) through an internally toothed wheel 15 attached to said wheel 4, in the same manner as what is known in automobile engineering as "internal drive."

The dead axle or the housing 16 of the live axle 12, has at its outer end a portion 16ᵃ made eccentric to the live axle 12, the remainder of said dead axle or housing 16 being concentric with said live axle 12. A worm wheel 17 with a crank 18 formed integral therewith is turnably mounted on said eccentric portion 16ᵃ, the periphery of the worm wheel 17 being concentric with said eccentric portion 16ᵃ.

The worm wheel 17 is for convenience located in a recess in the bogey 3, on which is mounted a worm 21, for imparting turning movement to the worm wheel 17 and crank 18 which latter carries at its outer end a stub axle 19 for an ordinary road wheel 4, with the internally toothed wheel 15 attached.

The turning of the worm wheel 17 and crank 18 on the eccentric portion 16ᵃ of the dead axle or housing 16, has the effect of raising or lowering the road wheel 4, as for instance if the worm wheel 17 and crank 18 be turned through half a circle from the position shown by full lines in Figure 2 the road wheel 4 will (ground clearance being provided) be lowered until it projects below the flanged wheel 3ᵃ (as indicated by dotted lines), and owing to the path of said wheel 4 about the live axle 12 and pinion 14 being eccentric thereto, the internally toothed wheel 15 on said wheel 4 will upon the latter coming to its lowermost or operative position be brought into mesh with the toothed pinion 14.

On the other hand if the worm wheel 17 and crank 18 be turned on the eccentric portion 16ᵃ through a half circle from the position shown dotted in Figure 4, the road wheel 4 will be raised from below the flanged wheel 3ᵃ to a position clear of the rail 25ᵃ on which the latter is to run, the eccentric path of the wheel 4 about the live axle 12 and pinion 14, at the same time causing the internally toothed wheel 15 to clear or to be de-meshed from the toothed pinion 14, so that when said wheel 4 is not being used, it is not being driven.

The worm 17 can be operated through any suitable means, and where a plurality of separate worms are employed, as illustrated, said worms can be geared together and operated from the same source.

Means suitable for locking the worm wheel 17 and crank 18 against turning movement, in order to prevent swinging of the wheel 4 about the dead axle or housing 16, either when said wheel 4 is in its operative or in its inoperative position, can consist in the case of each worm wheel 17, of a locking piece 26 pivoted to the bogey 3, and toothed to fit into the thread of the worm wheel 17, said locking piece 26 being connected by a rod 27 with a nut 28 threaded on a screw 29 anchored against vertical movement in a housing 30 on the bogey 3. The nut 28 is provided with lugs 28ᵃ which project through slots in the housing 30, for connection to rods 27 one to each of a pair of locking pieces 26. Any suitable means can be used for turning the screw 29 to raise or lower the nut 28, and to withdraw the locking pieces 26 from, or to force same into the worm wheels 17.

Each of the power driven ordinary road wheels 4 is raised and lowered in the same manner, and by lowering said wheels 4 and also the wheels 5 to take the road and support the vehicle, the latter can be used on the road under its own power, braking being effected per medium of the drums 13 on the flanged wheels 3ᵃ which latter are always in gear with the live axle 12.

The change from running on an ordinary road to running on a rail road, or vice versa can be conveniently effected at any point where the ordinary road and rail road are at the same level, provided the ordinary road is sloped away on either side of the road in the direction of the rail approaches.

To take the ordinary road from the rails the ordinary road wheels are lowered before arriving at the road crossing, with the result that the vehicle will ride up the slope on its road wheels to the road level with the flanged wheels clear of the latter, while to change from running on road wheels to running on the rails, the vehicle is run down the slope on its road wheels, until the flanged wheels run on the rails after which the road wheels are raised clear of the rails.

What I do claim and desire to obtain by Letters Patent of the United States of America is:—

1. In a transport vehicle having wheels capable of being raised and lowered upon turning a worm wheel, means for locking the latter comprising a pivoted locking piece toothed to fit in the thread of the worm wheel; a nut threaded on a screw held against end movement; a connecting rod between said locking piece, and said nut, and means for imparting turning movement to said screw.

2. A transport vehicle having a set of flanged wheels for running on rails, and a set of wheels for running on an ordinary road, means for lowering the latter wheels, to run on the ordinary road and bear the vehicle, and for raising said ordinary road wheels, to allow the flanged wheels to run on rails and bear the vehicles, and the front ordinary road wheels of the vehicle are mounted on stub axles, blocks in which said stub axles are pivoted and said blocks being adjustable in vertical guides.

3. A transport vehicle having a set of flanged wheels for running on rails, and a set of wheels for running on an ordinary road, means for lowering the latter wheels, to run on the ordinary road and bear the vehicle, and for raising said ordinary road wheels, to allow the flanged wheels to run on rails and bear the vehicle, and the front ordinary road wheels of the vehicle, are mounted on stub axles projecting from blocks slidable in guides on the main axle of said wheels, and screws threaded through said blocks and anchored in said guides for raising and lowering said stub axles.

4. A transport vehicle having a set of flanged wheels for running on rails, and a set of wheels for running on an ordinary road, means for lowering the latter wheels, to run on the ordinary road and bear the vehicle, and for raising said ordinary road wheels, to allow the flanged wheels to run on rails and bear the vehicle, and the rear ordinary road wheels are carried at the outer ends of cranks, adapted to be given turning movement for the purpose of raising said rear ordinary road wheels to clear a railroad, or for lowering said road wheels for use on an ordinary road, means for driving said rear road wheels and means for disconnecting said driving means.

5. A transport vehicle having a set of flanged wheels for running on rails, and a set of wheels for running on an ordinary road, means for lowering the latter wheels, to run on the ordinary road and bear the vehicle, and for raising said ordinary road wheels, to allow the flanged wheels to run on rails and bear the vehicle, and the rear ordinary road wheels are each carried at the outer end of a crank mounted eccentrically upon the live axle used to drive said wheel, so that upon the road wheel being raised the driving connection between the latter and said shaft is broken, and so that upon said road wheel being lowered it is drivably connected with said shaft.

6. A transport vehicle having a set of flanged wheels for running on rails, and a set of wheels for running on an ordinary road, means for lowering the latter wheels, to run on the ordinary road and bear the vehicle, and for raising said ordinary road wheels, to allow the flanged wheels to run on rails and bear the vehicle, and the rear ordinary road wheels are each carried at the outer end of a crank turnable on an eccentric portion of the housing of the live axle used to drive said road wheel, an internally toothed wheel on the latter, a toothed pinion on the live axle adapted to mesh with said internally toothed wheel, a worm and a worm wheel for turning the crank on said eccentric portion to raise the crank and de-mesh the internally toothed wheel from the pinion, and for lowering said crank to cause the internally toothed wheel to mesh with the pinion.

In testimony whereof I have signed my name to this specification.

VERNON ALFRED ALEXANDER VERNON.